United States Patent
Shin et al.

(10) Patent No.: US 8,332,461 B2
(45) Date of Patent: Dec. 11, 2012

(54) TASK MIGRATION SYSTEM AND METHOD THEREOF

(75) Inventors: Young Sam Shin, Hwaseong-si (KR); Seung Won Lee, Hwaseong-si (KR); Jeong Joon Yoo, Yongin-si (KR); Min Young Son, Yongin-si (KR); Shi Hwa Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 254 days.

(21) Appl. No.: 12/923,759

(22) Filed: Oct. 6, 2010

(65) Prior Publication Data

US 2011/0173633 A1 Jul. 14, 2011

(30) Foreign Application Priority Data

Jan. 14, 2010 (KR) ........................ 10-2010-0003369

(51) Int. Cl.
*G06F 9/48* (2006.01)
*G06F 13/00* (2006.01)

(52) U.S. Cl. ........ 709/201; 718/107; 718/100; 718/101; 718/108; 709/214; 709/215; 709/226; 709/213; 709/217; 709/223; 709/224; 709/218; 709/202; 707/704; 707/609; 707/809; 717/170; 717/174; 370/352

(58) Field of Classification Search .................. 718/107, 718/108, 100, 101
See application file for complete search history.

(56) References Cited

U.S. PATENT DOCUMENTS

| 5,655,132 | A | 8/1997 | Watson |
| 6,161,219 | A | 12/2000 | Ramkumar et al. |
| 7,346,664 | B2 * | 3/2008 | Wong et al. .................. 709/214 |
| 2005/0203988 | A1 | 9/2005 | Nollet et al. |
| 2009/0150458 | A1 * | 6/2009 | Igarashi ...................... 707/203 |
| 2010/0325273 | A1 * | 12/2010 | Kudo ........................... 709/224 |

FOREIGN PATENT DOCUMENTS

| KR | 10-2006-0132852 | 12/2006 |
| KR | 10-2009-0005921 | 1/2009 |
| KR | 10-2009-0066765 | 6/2009 |
| KR | 10-2009-0080753 | 7/2009 |

* cited by examiner

*Primary Examiner* — Jude Jean Gilles
(74) *Attorney, Agent, or Firm* — Staas & Halsey LLP (57) ABSTRACT

A task migration system is provided which transmits a migration request signal for a plurality of first tasks to a migration manager using a resource manager, transmits information used in response to the migration request signal from a migration initiation handler to the migration manager when a first task, of which a migration point is in a capture ready state, among the plurality of first tasks is received from a processor, and captures, using the migration manager, the migration point of the first task in the capture ready state, in response to a migration request signal for the first task in the capture ready state, so that the first task with the captured migration point migrates to a second task.

19 Claims, 8 Drawing Sheets

FIRST TASK                    SECOND TASK

TASK MIGRATION SYSTEM AND METHOD THEREOF

CROSS-REFERENCE TO RELATED APPLICATIONS

This application claims the benefit of Korean Patent Application No. 10-2010-0003369, filed on Jan. 14, 2010, in the Korean Intellectual Property Office, the disclosure of which is incorporated herein by reference.

BACKGROUND

1. Field

One or more embodiments of the following description relate to a system and method for dynamic task migration in a multiprocessor computing environment.

2. Description of the Related Art

As applications such as multimedia being processed in real-time increase, demand for improvement of system performance for computing devices is increasing. Moreover, it becomes difficult to efficiently and rapidly process an application using only a single processor. Due to such a challenge, multiprocessor computing technologies have emerged along with development of semiconductor integration technologies. Multiprocessors provide many advantages in energy efficiency and performance improvement, compared with single processors.

To obtain more suitable performance in a multiprocessor computing environment, tasks may be executed sequentially, or in parallel, depending on the task.

An information device using a multiprocessor may include, for example, a personal portable terminal, a server, a mobile phone, a mobile computer, a Set-Top Box (STB), or a digital video device. The information device may be expected to be a major part of a future embedded system. Accordingly, the information device may enable various applications to be executed in a single device on demand by a user.

A multiprocessor may be classified into a homogeneous multiprocessor, and a heterogeneous multiprocessor. The homogeneous multiprocessor may connect homogeneous processors using the same Instruction Set Processor (ISP) through an interconnection mechanism, such as a bus or a Network on Chip (NoC). The heterogeneous multiprocessor may connect several ISPs to devices with hardware programming characteristics, through an interconnection mechanism. Here, the devices with hardware programming characteristics may include, for example, a Digital Signal Processor (DSP), a Field Programmable Gate Array (FPGA), a Reconfigurable Processor (RP), and the like.

In a heterogeneous multiprocessor computing environment, limited computing resources may be utilized to the maximum, to optimize a system suitable for an application. Additionally, the system may be reconstructed to be optimized when a change in an application occurs or when an environment changes, and the application is being executed on demand by a user.

SUMMARY

Additional aspects and/or advantages will be set forth in part in the description which follows and, in part, will be apparent from the description, or may be learned by practice of the embodiments.

The foregoing and/or other aspects are achieved by providing a task migration system, including a resource manager to transmit a migration request signal for a plurality of first tasks to a migration manager, a migration initiation handler to transmit information used in response to the migration request signal to the migration manager, when a first task among the plurality of first tasks is received from a processor and a migration point of the first task being in a capture ready state, and the migration manager to capture the migration point of the first task, in response to a migration request signal for the first task, and to convert the first task with the captured migration point to a second task.

The foregoing and/or other aspects are achieved by providing a task migration method including transmitting, by a resource manager, a migration request signal for a plurality of first tasks to a migration manager, transmitting information used in response to the migration request signal from a migration initiation handler to the migration manager, when a first task among the plurality of first tasks is received from a processor and a migration point of the first task being in a capture ready state, and capturing, by the migration manager, the migration point of the first task, in response to a migration request signal for the first task, and converting the first task with the captured migration point to a second task.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings, wherein like reference numerals refer to the like elements throughout. The embodiments are described below by referring to the figures.

Reference will now be made in detail to embodiments, examples of which are illustrated in the accompanying drawings, wherein like reference numerals refer to the like elements throughout. Embodiments are described below to explain the present disclosure by referring to the figures.

A multiprocessor computing platform of a system including a task migration device according to embodiments may be configured by connecting one or more Instruction Set Processors (ISPs), a predetermined hardware device such as an Application-Specific Integrated Circuit (ASIC), and reconfigurable devices such as a Field Programmable Gate Array (FPGA), through a communication channel, such as a bus or a Network on Chip (NoC).

The task migration device, configured based on the multiprocessor computing platform, may include one or more ISPs where an Operating System (OS) and system software may be executed. Hereinafter, the ISPs may be referred to as "General Purpose Processors (GPPs)."

Figure 1:
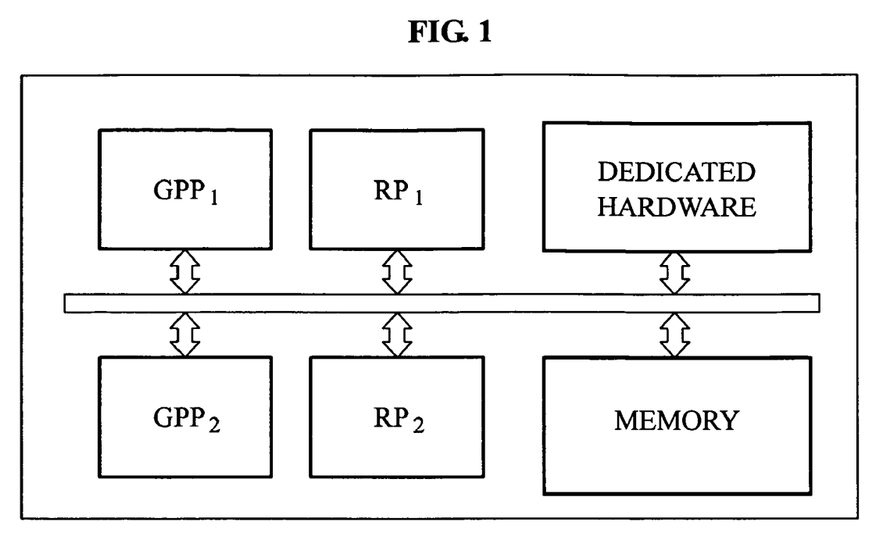
FIG. 1 illustrates a block diagram of a system for task migration in a heterogeneous multiprocessor computing environment according to embodiments.

FIG. 1 illustrates a block diagram of a system for task migration in a heterogeneous multiprocessor computing environment according to embodiments.

Referring to FIG. 1, a GPP may be, for example, an ISP such as an Advanced RISC Machine (ARM), and a Reconfigurable Processor (RP) may be, for example, a processor with a Very Long Instruction Word (VLIW) and a small cell structure. However, there is no limitation to the cell structure.

Figure 2:
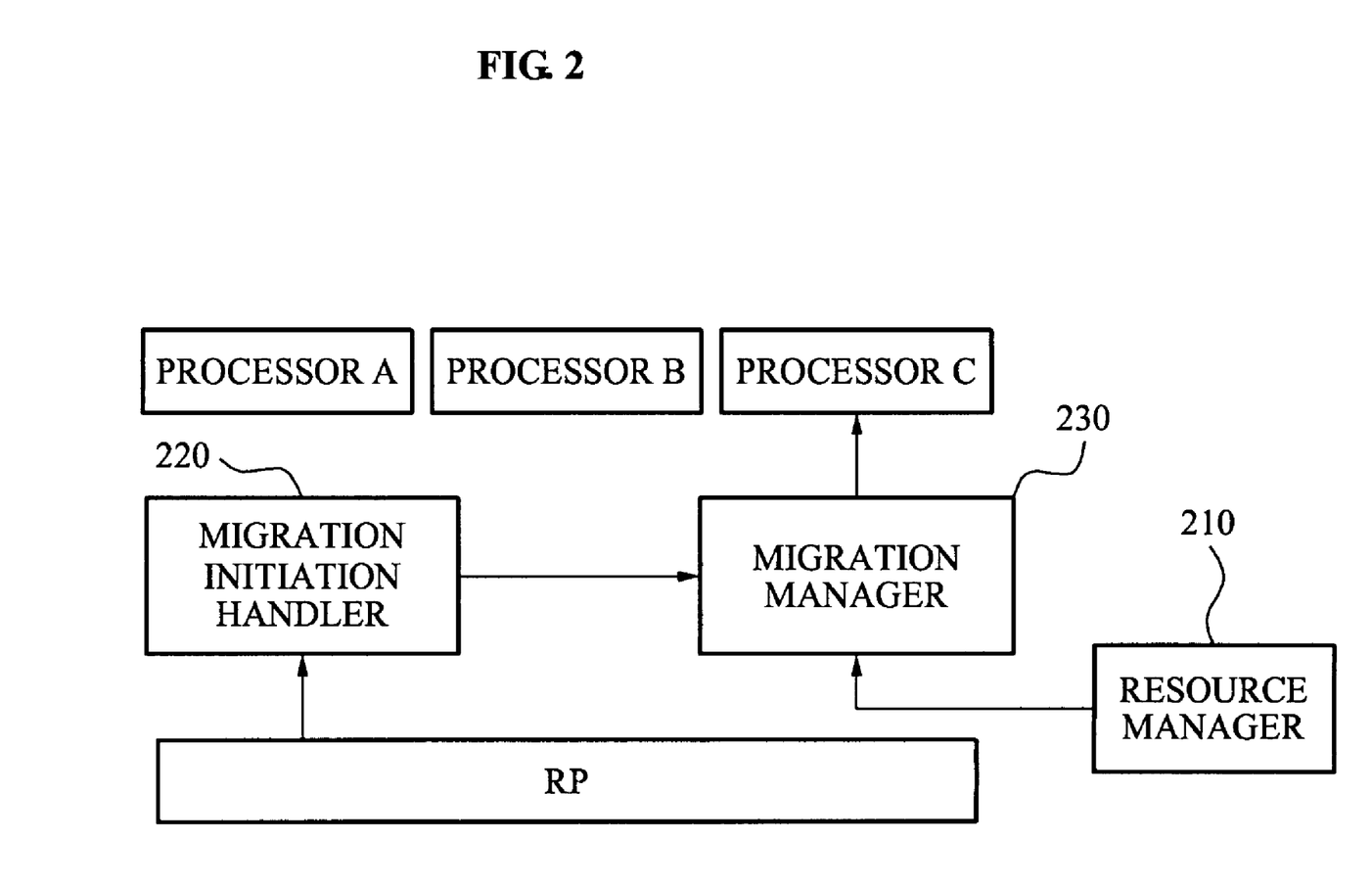
FIG. 2 illustrates a block diagram of a task migration system according to embodiments.

FIG. 2 illustrates a block diagram of a task migration system according to embodiments.

The task migration system of FIG. 2 may broadly include a resource manager 210, a migration initiation handler 220, and a migration manager 230.

The resource manager 210 may transmit a migration request signal for a plurality of first tasks to the migration manager 230. When a first task, of which a migration point is in a capture ready state, among the plurality of first tasks is received from a processor, the migration initiation handler 220 may transmit information used in response to the migration request signal to the migration manager 230.

The migration manager 230 may capture the migration point of the first task in response to a migration request signal for the first task, and may convert the first task with the captured migration point to a second task.

The resource manager 210, the migration initiation handler 220, and the migration manager 230 may be combined in a single module, however, they may be separate for functional efficiency as described below.

For example, in the task migration system according to the embodiment, a task of a hardware type may be executed in hardware such as an ASIC, and a task of an instruction code type may be executed in a GPP.

Additionally, in the task migration system of FIG. 2, when the migration request for the first task is received in order to manage resources, the resource manager 210 may transmit the migration request to the migration manager 230. The migration manager 230 may extract information of the first task from a memory, and may perform capturing of the migration point of the first task.

Figure 3:
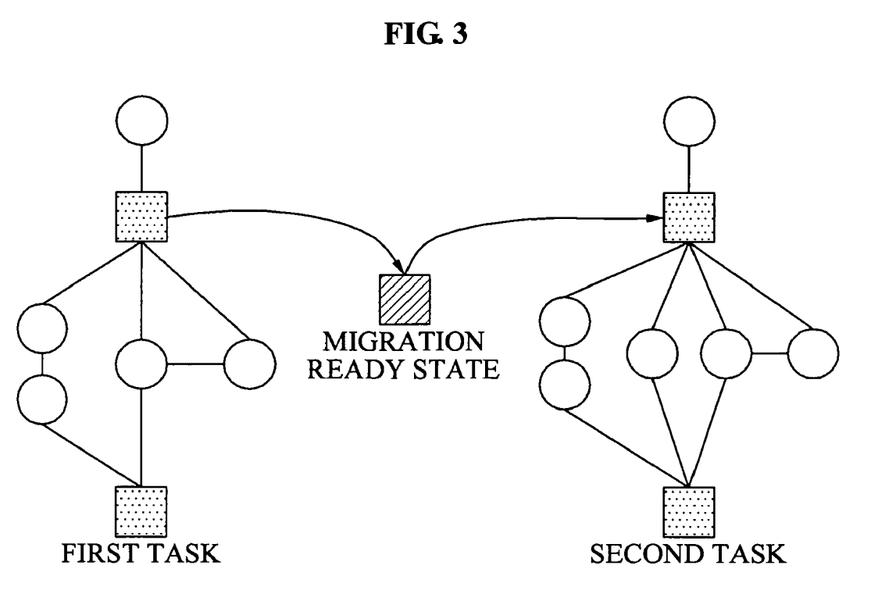
FIG. 3 illustrates a diagram of an operation of capturing a migration point of a task according to embodiments.

FIG. 3 illustrates a diagram of an operation of capturing a migration point of a task according to embodiments.

Referring to FIG. 3, it will be understood that in the task migration system according to the embodiments, an operation of capturing a migration point of a first task and a migration point of a second task may be performed. Here, the first task and the second task may be executed on processors with different ISP structures, and each of the migration points may have characteristics as below.

The migration point may be set to be in a same state as a state of information of the first task converted to the second task. Additionally, the migration point may be set to have a minimum context as possible.

Furthermore, the migration point may be set by a compiler to map an address for an execution code to a sequence of the migration point. For example, when the migration point of the first task has the same sequence as that of the second task, the first task may be in a same state as a state of the second task, as shown in Equation 1 below.

$$\text{MP}i \text{ state for the first task} = \text{MP}i \text{ state for the second task} \quad \text{[Equation 1]}$$

In Equation 1, MPi denotes a migration point.

To more efficiently use the migration point, behavioral characteristics of an application may be analyzed first. Accordingly, the migration point may be used in a user level, and thus, a user may set where a processor forming an application is located on a program with a minimum migration state.

Figure 4:
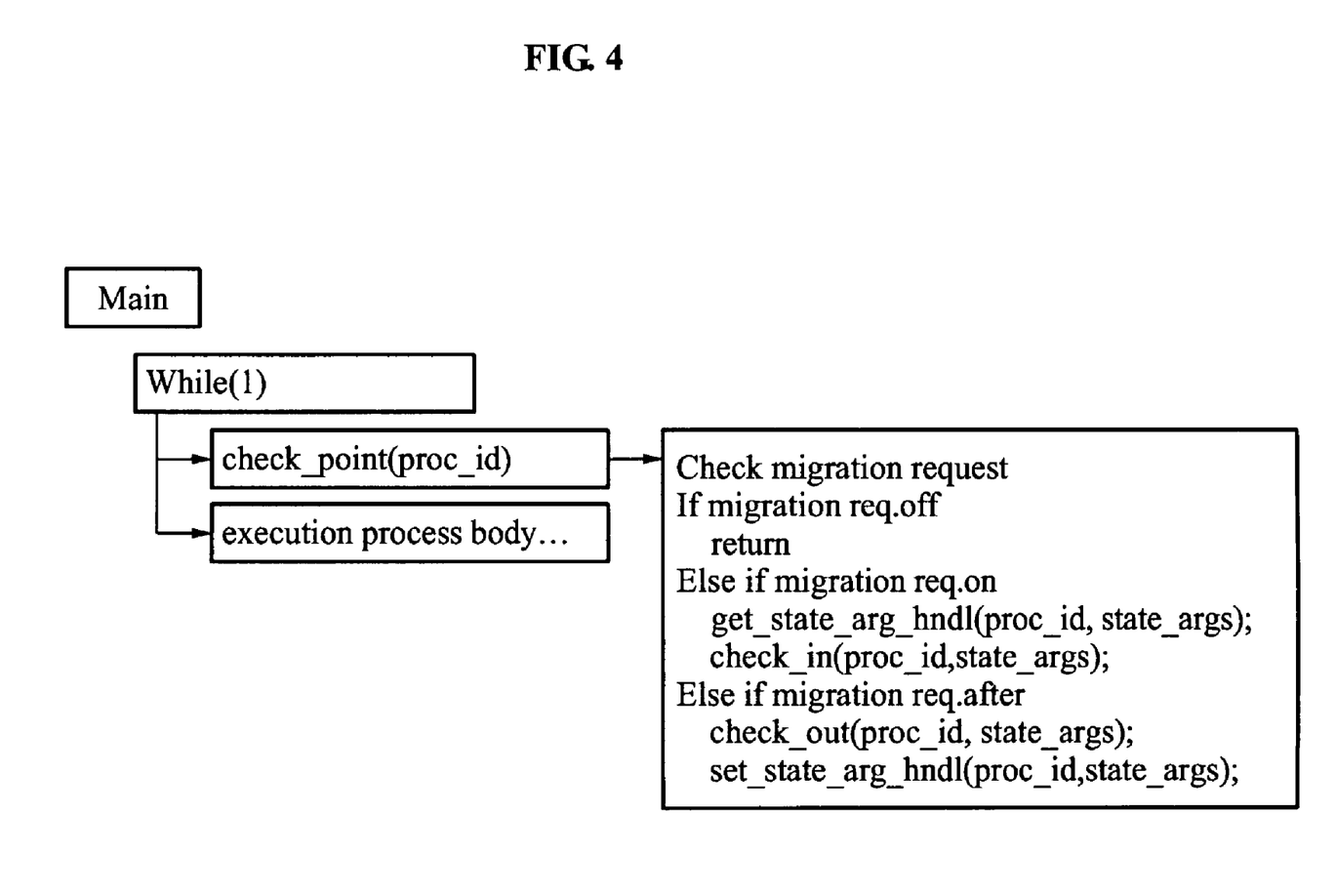
FIG. 4 illustrates a diagram of an operation of processing a migration point in a task migration system according to embodiments.

FIG. 4 illustrates a diagram of an operation of processing a migration point in a task migration system according to embodiments.

As shown in FIG. 4, the operation of processing the migration point may be broadly applied, for example, to a migration between processors having different ISPs. Additionally, the same point may be designated in an execution state of a processor, and a machine independent state of the execution state may be transferred to the designated point, so that the processor may be re-executed in a destination node.

Figure 5:
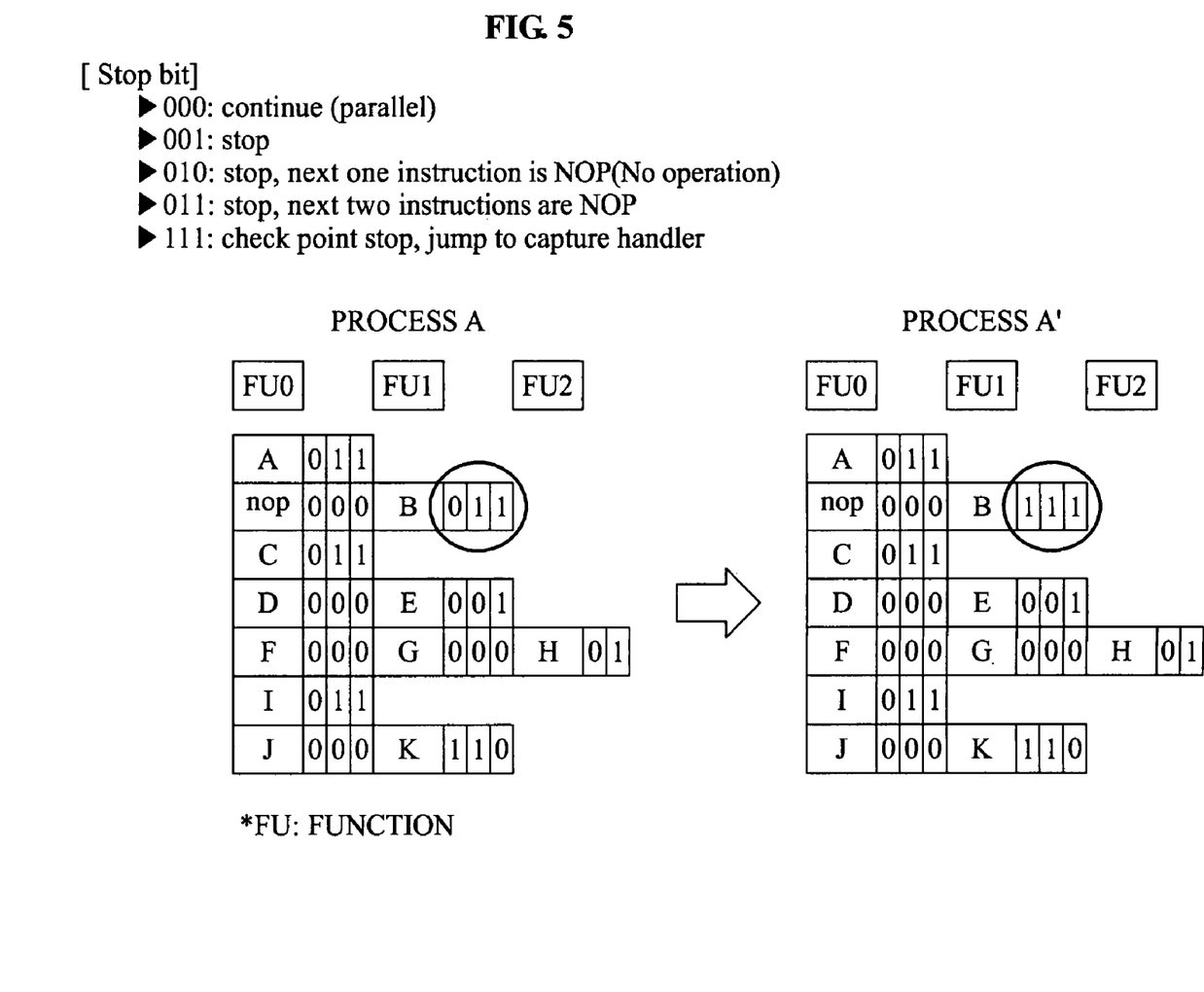
FIG. 5 illustrates a diagram of a scheme of capturing a migration point using a stop bit according to embodiments.

FIG. 5 illustrates a diagram of a scheme of capturing a migration point using a stop bit according to embodiments.

Referring to FIG. 5, the task migration system according to the embodiments may set a state of a task so that the task may define a minimum amount of information to be transferred to a migrated task. Additionally, the task migration system may enable a migration point function to be placed in a task corresponding to the migration point.

For example, when a task execution is located in a migration point, the task migration system may determine whether a migration request for the task is received, based on a task identifier of the task.

In this example, when there is no migration request for the task, the task migration system may return to a standby state, and may continue to execute the task. Alternatively, when the migration request is determined to be received, the task migration system may store a current state of a task to be transferred, and may call the migration indication handler 220.

Additionally, when the state of the task is completely stored, the task migration system may call a check_in function to perform a migration of the task, may stop an execution of a source task depending on a migration type, and may transfer the state to a task migrated to the destination node.

When all states are transferred to the migrated task, and when the migrated task is executed in the destination node, the task migration system may execute the migration point; may receive the state of the source task through checkout, may call the migration initiation handler 220 to set a state of a currently executed task, and may set the state of the currently executed task to be identical to that of the source task.

When the migration point is used as described above, a runtime overhead may occur to determine whether a migration request is received during a normal execution of a processor. As a number of times the task with the migration point is executed increases, a reaction delay of the migration request decreases, while the runtime overhead increases. Accordingly, a variety of schemes may be provided to reduce the runtime overhead caused by the migration point.

For example, to reduce the runtime overhead, a scheme of a polling function on a checkpoint may be used. In the scheme, a global parameter may be set, and the global parameter may be checked at every poll point in response to a migration request.

In this example, while it may be easy to apply a matrix, a runtime overhead may be incurred in proportion to an excessively large number of poll points, and a reaction delay may increase in proportion to an excessively small number of poll points.

Additionally, to reduce the runtime overhead, a scheme of dynamic modification of the code at the checkpoint may be used. The scheme may enable initiation of migration by adding a diverging point to an execution code based on migration point information, in response to a migration request. To insert a divergent instruction code, additional dummy codes may be inserted into an original code, and the dummy codes may be replaced with a divergent instruction in response to the migration request.

Here, the scheme may cause a performance overhead of the dummy codes to be incurred during a normal task execution, even though the performance overhead of the dummy codes is relatively less than that of poll points.

Lastly, to reduce the runtime overhead, a scheme of hardware supported for migration check may be used. In the scheme, an additional hardware module to capture a migration point may be added to a processor, or an instruction address compare register of a debug mode may be used.

In the scheme, while there is no execution overhead of a task in a normal state, it may be difficult to generally apply the scheme. Additionally, a number of migration points may be restricted by a number of compare registers, an interference of a debugger may occur, and there may be almost no support of a compiler to use a corresponding function.

The embodiments may propose two schemes to capture a migration point on a processor using a VLIW. The two schemes may includes a first scheme of adding a hardware logic that compares a current program counter (PC) value with a PC value corresponding to a migration point, and a second scheme of using a stop bit in a VLIW instruction.

In the first scheme, since designation of the migration point may be restricted by a number of registers where an address for the migration point is to be stored, the comparison with the current PC value may be performed in an actual single instruction cycle. In other words, a number of supportable registers may be very limiting.

Thus, according to the embodiments, the stop bit may be added to capture a migration point in the VLIW instruction, and the stop bit may be modified to a migration point stop bit at the migration point for migration in an instruction code of a corresponding task in a task migration request location.

Subsequently, when an execution of a task reaches a migration point, the task may migrate to a set migration checkpoint handler, so that task migration may be performed.

For example, when a migration request for task B is received from the OS, a migration point stop bit may be modified to "111" in a stop bit of an instruction corresponding to a migration point.

In this example, an original stop bit value may be separately stored for future restoration, and processor A' of which a code is modified may be captured by a stop bit at a point where the migration point is executed during execution of processor A'. Additionally, the information may be transferred to a migration manager by a migration instruction handler, and a migration of task B may be performed based on the information.

Hereinafter, a task migration method according to the embodiments will be described with reference to FIGS. 6 through 8.

Figure 6:
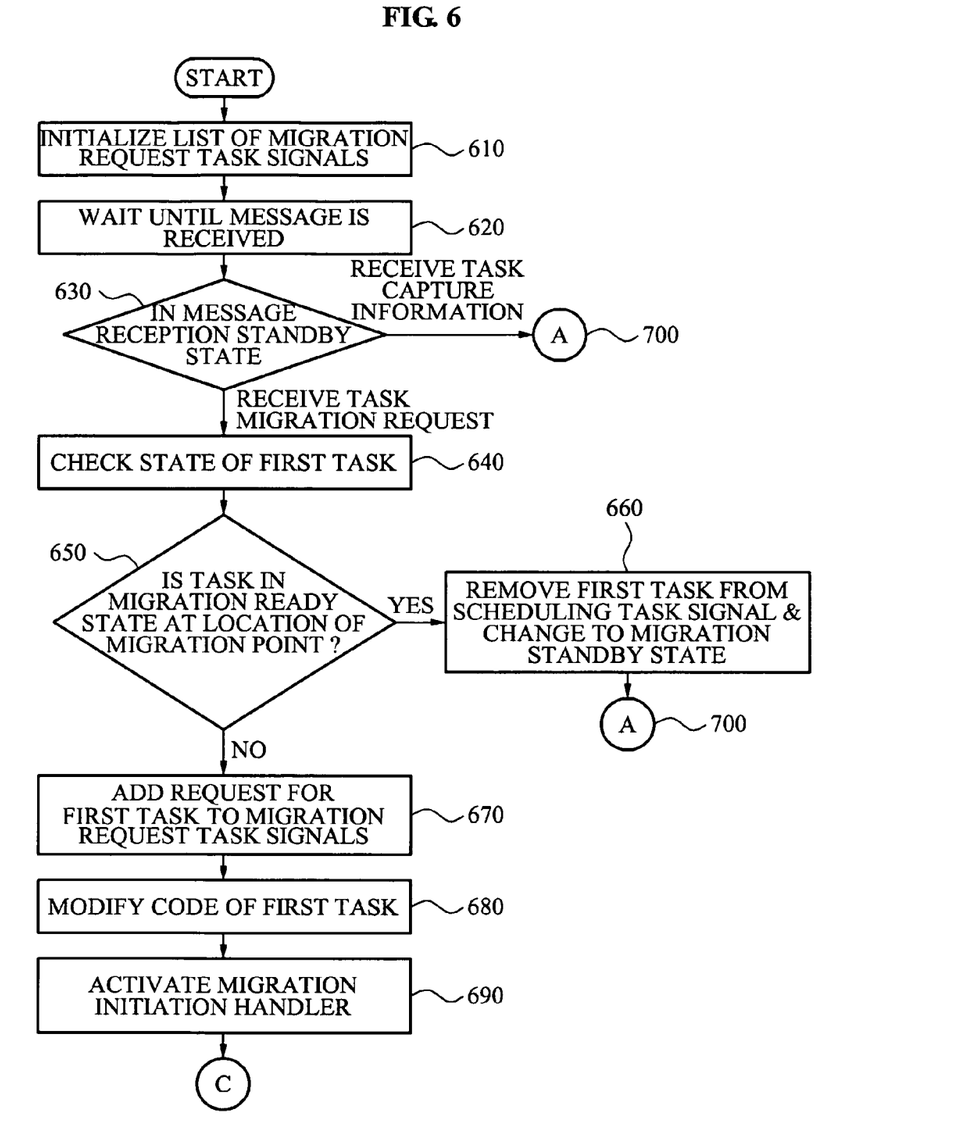
FIGS. 6 and 7 illustrate flowcharts of a task migration method performed by a migration manager according to embodiments.
Figure 7:
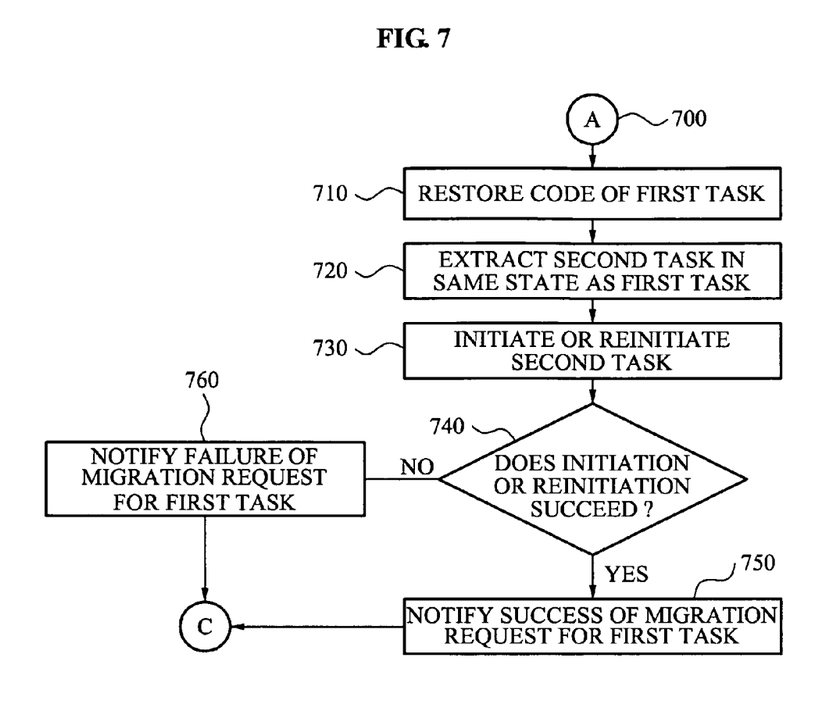

FIGS. 6 and 7 illustrate flowcharts of a task migration method performed by a migration manager according to embodiments.

First, the migration manager may initialize a list of migration request task signals, and may wait until a message is received in operations 610 and 620.

In operation 630, the migration manager may determine whether task capture information is received or a task migration request signal is received in a message reception standby state.

Specifically, when capture information for a first task is received from a migration initiation handler, the migration manager may perform a conversion of the first task, and may control the first task to migrate to a second task in operation 700.

When a migration request signal for the first task is received from a resource manager, the migration manager may check a state of the first task, and may determine whether the first task is in a migration ready state at a location of the migration point in operations 640 and 650.

When the first task is determined to be in the migration ready state at the location of the migration point, the migration manager may remove the first task from a scheduling task signal and may change the state of the first task to a migration standby state in operation 660. Additionally, the migration manager may perform a conversion of the first task, and may control the first task to migrate to the second task in operation 700.

After operation 700, the migration manager may restore a code of the first task in operation 710. The migration manager may extract the second task being in the same state as the first task, and may initiate or reinitiate the second task at the location of the migration point in operations 720 through 760.

Alternatively, when the first task is determined not to be in the migration ready state at the location of the migration point, the migration manager may add a request signal for the first task to the migration request task signals in operation 670.

Subsequently, when the request signal for the first task (for example, task A) is added to the migration request task signal, the migration manager may copy an original code of the first task to a memory, and may modify a code of a location of the first task to a stop code in operation 680.

When the code of the location of the first task is modified to the stop code, the migration manager may control the migration initiation handler to be activated in operation 690.

Figure 8:
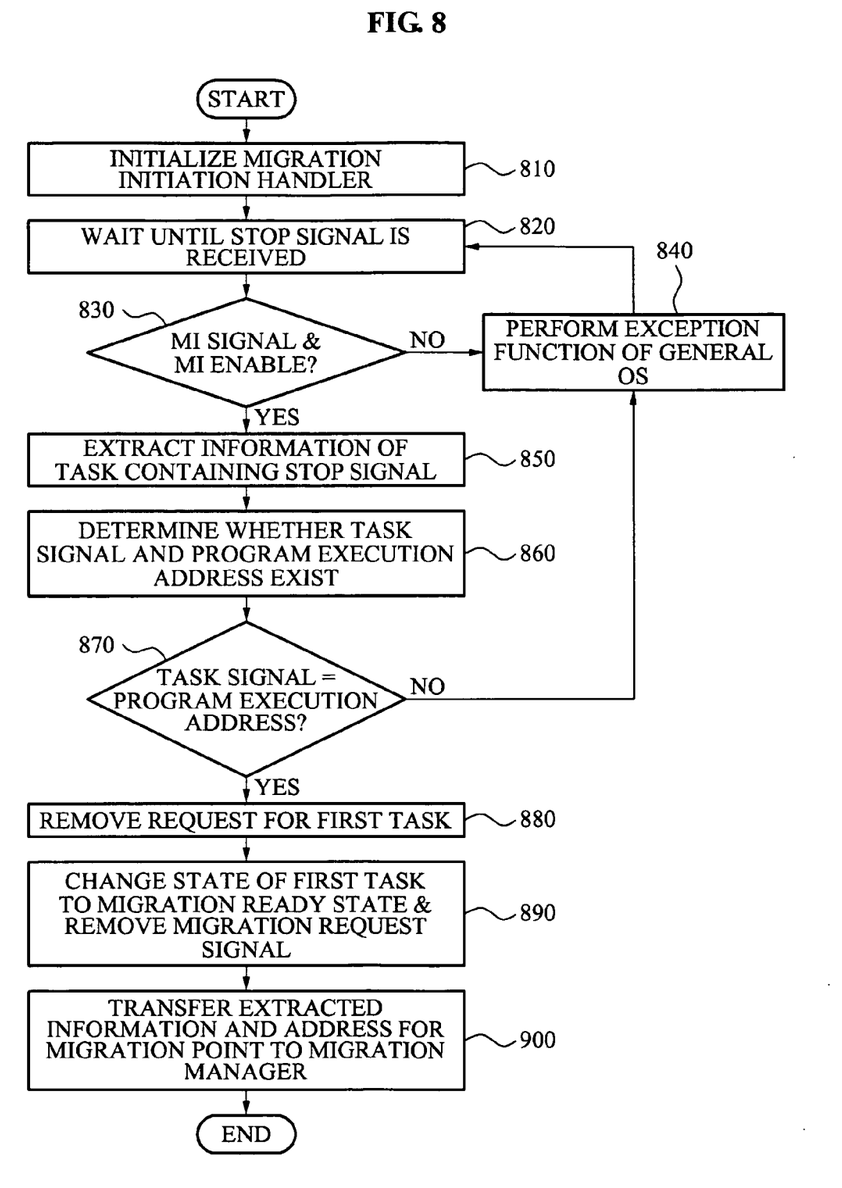
FIG. 8 illustrates a flowchart of a task migration method performed by a migration initiation handler according to embodiments.

FIG. 8 illustrates a flowchart of a task migration method performed by a migration initiation handler according to embodiments.

Referring to FIG. 8, the migration initiation handler may be initialized, and may wait until a stop signal is received in operations 810 and 820.

Specifically, when a stop signal corresponding to an execution stop code is received, the migration initiation handler may extract information of the first task, and may determine whether a task signal and a program execution address exist in operations 830 through 860. Here, the task signal may contain an exception signal among the migration request task signals.

When the task signal is identical to the program execution address, the migration initiation handler may remove a request for the first task, may change the state of the first task to the migration ready state in a scheduling task signal, and may remove a migration request signal in operations 870 through 890.

After operations 890, the migration initiation handler may transmit the extracted information of the first task and an address for the migration point to the migration manager in operation 900.

According to the embodiments, it is possible to efficiently perform migration between multiple tasks, when the multiple tasks are executed on a multiprocessor.

Additionally, according to the embodiments, it is possible to dynamically reconstruct an optimal system in a heterogeneous multiprocessor environment.

Furthermore, according to the embodiments, it is possible to monitor a system, to search for an optimal reconstruction combination, and to appropriately handle errors, through a dynamic task migration in a multiprocessor computing environment.

The above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A task migration system, comprising:
    a resource manager to transmit a migration request signal for a plurality of first tasks to a migration manager;
    a migration initiation handler to transmit information used in response to the migration request signal to the migration manager, when a first task among the plurality of first tasks is received from a processor and a migration point of the first task being in a capture ready state; and
    the migration manager to capture the migration point of the first task in the capture ready state, in response to a migration request signal for the first task in the capture ready state, and to convert the first task with the captured migration point to a second task.

2. The task migration system of claim 1, wherein the migration point is set to be in a same state as a state of information of the first task converted to the second task.

3. The task migration system of claim 1, wherein the migration point is set so that a context of the first task is identical to a context of the second task.

4. The task migration system of claim 1, wherein the migration point is set to map an address for an execution code to a sequence of the migration point.

5. The task migration system of claim 1, wherein, when the migration request signal for the plurality of first tasks is received from the resource manager, the migration manager checks a state of the first task and determines whether the first task is in a migration ready state at a location of the migration point, and
    when the first task is determined to be in the migration ready state at the location of the migration point, the migration manager performs a conversion of the first task so that the first task migrates to the second task.

6. The task migration system of claim 5, wherein the migration manager restores a code of the first task, extracts the second task in the same state as the first task, and initiates or reinitiates the second task at the location of the migration point.

7. The task migration system of claim 5, wherein, when the first task is determined not to be in the migration ready state at the location of the migration point, the migration manager adds a request signal for the first task to a plurality of migration request task signals.

8. The task migration system of claim 7, wherein, when the request signal for the first task is added to the migration request task signals, the migration manager copies an original code of the first task to a memory, and modifies a code of a location of the first task to an execution stop code.

9. The task migration system of claim 8, wherein, when the code of the location of the first task is modified to the execution stop code, the migration manager controls the migration initiation handler to be activated.

10. The task migration system of claim 9, wherein, when a stop signal corresponding to the execution stop code is received, the migration initiation handler extracts information of the first task, and determines whether a task signal and a program execution address exit, the task signal containing an exception signal among the migration request task signals.

11. The task migration system of claim 10, wherein, when the task signal is identical to the program execution address, the migration initiation handler removes a request for the first task, changes the state of the first task to the migration ready state, and removes the migration request signal for the first task from a task scheduling queue.

12. The task migration system of claim 11, wherein, when the state first task is changed to the migration ready state and the migration request signal is removed, the migration initiation handler transmits the extracted information of the first task and an address for the migration point to the migration manager.

13. A task migration method, comprising:
    transmitting, by a resource manager, a migration request signal for a plurality of first tasks to a migration manager;
    transmitting information used in response to the migration request signal from a migration initiation handler to the migration manager, when a first task among the plurality of first tasks is received from a processor and a migration point of the first task being in a capture ready state; and
    capturing, by the migration manager, the migration point of the first task in the capture ready state, in response to a migration request signal for the first task in the capture ready state, and converting the first task with the captured migration point to a second task.

14. The task migration method of claim 13, further comprising:
    checking, by the migration manager, a state of the first task and determining whether the first task is in a migration ready state at a location of the migration point, when the migration request signal for the plurality of first tasks is received from the resource manager; and
    performing, by the migration manager, a conversion of the first task and so that the first task migrates to the second task, when the first task is determined to be in the migration ready state at the location of the migration point.

15. The task migration method of claim 14, wherein the performing of the conversion of the first task comprises:
- restoring, by the migration manager, a code of the first task; and
- extracting, by the migration manager, the second task in the same state as the first task, and initiating or reinitiating the second task at the location of the migration point.

16. The task migration method of claim 14, further comprising:
- adding, by the migration manager, a request signal for the first task to a plurality of migration request task signals, when the first task is determined not to be in the migration ready state at the location of the migration point;
- copying, by the migration manager, an original code of the first task to a memory;
- modifying, by the migration manager, a code of a location of the first task to an execution stop code; and
- controlling, by the migration manager, a migration initiation handler to be activated.

17. The task migration method of claim 16, further comprising:
- extracting, by the migration initiation handler, information of the first task, when a stop signal corresponding to the execution stop code is received by the migration initiation handler; and
- determining, by the migration initiation handler, whether a task signal and a program execution address exit, the task signal containing an exception signal among the migration request task signals.

18. The task migration method of claim 17, further comprising:
- removing, by the migration initiation handler, a request for the first task, when the task signal is identical to the program execution address;
- changing, by the migration initiation handler, the state of the first task to the migration ready state and removing the migration request signal for the first task from a task scheduling queue; and
- transmitting the extracted information of the first task and an address for the migration point from the migration initiation handler to the migration manager.

19. A non-transitory computer readable recording medium storing a program to cause a computer to implement the method of claim 13.

* * * * *